(12) United States Patent
Rodewald et al.

(10) Patent No.: US 6,674,370 B2
(45) Date of Patent: Jan. 6, 2004

(54) DISPLAY ARRANGEMENT IN A VEHICLE

(75) Inventors: Andreas Rodewald, Herrenberg (DE); Harald Ruoff, Stuttgart (DE); Kai Wagner, Kornwestheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/853,864

(22) Filed: May 14, 2001

(65) Prior Publication Data

US 2002/0005777 A1 Jan. 17, 2002

(30) Foreign Application Priority Data

May 13, 2000 (DE) ......................................... 100 23 585

(51) Int. Cl.$^7$ ................................................ G08B 5/00
(52) U.S. Cl. .................... 340/815.4; 340/438; 359/843; 359/877
(58) Field of Search .................... 359/548, 555, 359/520, 604, 841, 843, 844, 877; 340/815.4, 438, 459, 461

(56) References Cited

U.S. PATENT DOCUMENTS

| 4,908,611 A | * | 3/1990 | Iino | |
| 4,962,998 A | * | 10/1990 | Iino | |
| 6,304,173 B2 | * | 10/2001 | Pala et al. | 340/461 |
| 6,366,213 B2 | * | 4/2002 | DeLine et al. | 340/815.4 |

FOREIGN PATENT DOCUMENTS

EP          937 601 A2        8/1999

* cited by examiner

Primary Examiner—Daryl Pope
(74) Attorney, Agent, or Firm—Crowell & Moring LLP

(57) ABSTRACT

A display apparatus on the vehicle ceiling, in front of a partition wall which blocks the view of the rear window from the internal rear-view mirror, in order to display information, in particular about an area to the rear of the vehicle which is monitored by a monitoring device. When driving rearwards, the internal mirror is deflected, for example being pivoted automatically upwards from the position of the direction of travel selection lever, so that the driver can read the display, which is otherwise located outside the mirror field of view, via the rear-view mirror.

9 Claims, 1 Drawing Sheet

DISPLAY ARRANGEMENT IN A VEHICLE

BACKGROUND AND SUMMARY OF THE INVENTION

This application claims the priority of German Patent Document 100 23 585.9, filed May 13, 2000, the disclosure of which is expressly incorporated by reference herein.

The invention relates to a display arrangement in a vehicle. In passenger cars, the driver normally has a view of the traffic situation behind the vehicle via an internal rear-view mirror when driving forwards. When driving rearwards, information about the rearward area can be obtained both from the view from the rear-view mirror and by looking directly backwards. Furthermore, a large number of displays are provided in vehicles, which are concentrated predominantly in the dashboard at the front. An arrangement is known from EP 0 937 601 A2, in which an optical display is provided in or on the housing of the internal rear-view mirror, or else a display apparatus is arranged in the housing interior behind the mirror surface.

For driving rearwards, which typically takes place when manoeuvring in a confined environment, in particular when parking, systems to provide assistance are also already known, in which a monitoring device for a rearward monitoring area is used to provide additional information about the situation behind the vehicle, for example the distance to obstructions, the edge of the roadway, and the curb etc. This information can be reproduced, for example, as an image, numerical or symbolic representation on a display which can be seen by the driver. For example, different distances can be represented visually by bar displays. For example, it is known for such a display apparatus to be arranged in the rear area of the vehicle ceiling in order to display information from a rearward monitoring area. The driver can read the display both in the rear-view mirror and by looking directly to the rear when driving rearwards.

In vehicles in which the view to the rear can be blocked at times, for example by a load, by a partition wall in the passenger compartment behind the driver etc., the driver can neither look through the rear window, nor can he read such a display.

The present invention is based on the object of specifying a display arrangement with increased display options.

The automatic mirror adjustment device of the display apparatus, which is at a distance from the mirror and, in particular, is arranged offset to the rear, can be seen by the driver without effort or, provided the display apparatus was previously already entirely or partially visible at the edge of the mirror field of view, moved further towards the centre of the mirror field of view. The content which can be reproduced by the display apparatus may be dependent on the nature of the variable parameter which is used as the basis for repositioning the mirror, or else on a parameter combination.

The automatic alignment, according to the invention, of the field of view of the rear-view mirror to the display apparatus is particularly advantageous in situations in which the change in the vehicle parameter is associated with a considerable adverse effect or loss of the information which the driver can see with the first mirror alignment, and/or in situations in which the driver's view to the rear may be impeded at times.

For example, in the case of vehicles having a partition wall which can be set up behind the driver, the view to the rear is blocked when the partition wall is set up, and the mirror information in the first alignment is thus lost. One parameter for mirror repositioning may thus advantageously be the position of such a partition wall. Another parameter may be, for example, the operating mode of a rear high-intensity fog light, on the assumption that the rearward view via the rear-view mirror is less useful when this light is being operated.

The invention is particularly advantageous in vehicles which have a monitoring device for a rearward monitoring area outside the vehicle, in particular in the form of a parking aid. Information obtained via the monitoring device can then be displayed via the display apparatus.

The direction of travel selected via a direction of travel selection apparatus is preferably a parameter for the repositioning of the rear-view mirror, with the further alignment of the rear-view mirror being associated with the selection of the rearward direction of travel.

The invention is particularly advantageous in vehicles in which the driver's view to the rear may be impeded at times.

The automatic adjustment of the rear-view mirror allows the display apparatus to be positioned such that it can be seen via the rear-view mirror even when the view to the rear is blocked and, when the view to the rear is free, the normal rear-view mirror field of view can be maintained for the driver when driving forwards. The automatic adjustment of the mirror alignment results in the high level of design freedom for the position of the display. In particular, the display apparatus can be arranged other than in the front dashboard, in which the installation space is generally very confined and the amount of information is already very high. One preferred embodiment provides for the display apparatus to be arranged on the vehicle ceiling, where it can be mounted in a stable manner with little effort and there is virtually no adverse effect on the use and configuration of the interior. Furthermore, developments and experiences with the already mentioned conventional display apparatuses can be used and improved upon.

The display apparatus is advantageously arranged in the vehicle longitudinal direction in front of the possible view obstruction such as a partition or load, in particular slightly in front of the view obstruction. The position of the display apparatus in the vehicle longitudinal direction is preferably at approximately the same level as the top of the back of the driver's seat.

Automatic adjustment of the mirror alignment on the basis of the selected direction of travel avoids the driver having to carry out cumbersome manual mirror adjustment and also allows more precise alignment to the display apparatus, matched to the driver currently driving the vehicle. The combination with a mirror alignment which can be matched automatically on the basis of stored data to different individual drivers and which is frequently also linked to automatic driver's seat adjustment is particularly advantageous. Mechanisms for automatic internal rear-view mirror adjustment, operated in particular by an electric motor, are also known from this application.

The derivation of the automatic mirror adjustment from a direction of travel selection apparatus, in particular a gear lever of a manual transmission or the shift lever of an automatic transmission requires particularly little effort since, when rearward travel is selected, an electrical signal is generally present in any case for switching a reversing light and can be used to operate the mirror adjustment according to the invention.

When fitted at a position which cannot be concealed by a partition or load, and when the internal rear-view mirror is aligned for driving forwards, the display apparatus is generally not visible, or at best visible at the edge, in the field of view of the rear-view mirror, which in this situation is concentrated on the rear window of the vehicle. When the rearward direction of travel is selected and the mirror alignment is repositioned accordingly, the field of view of the internal mirror faces the display apparatus, so that it is moved closer to the centre of the field of view.

Other objects, advantages and novel features of the present invention will become apparent from the following detailed description of the invention when considered in conjunction with the accompanying drawings.

BRIEF DESCRIPTION OF THE DRAWINGS

The invention will be explained in more detail in the following text using a preferred exemplary embodiment and with reference to the figures, in which.

DETAILED DESCRIPTION OF THE PREFERRED EMBODIMENT

In the arrangements sketched in the figures, it is assumed that the internal rear-view mirror RS of a vehicle can be adjusted by an electric motor and can be matched to the respective person driving the vehicle on the basis of individual driver data, which can be stored in the vehicle or in an individual portable data storage medium, such as a card or key. This feature is known per se in conjunction with personal driver seat adjustment as a memory function. The driver is preferably identified via a portable data storage medium or a control input, with the setting data being stored in the vehicle. Other automatic personal settings are feasible.

Figure 1:
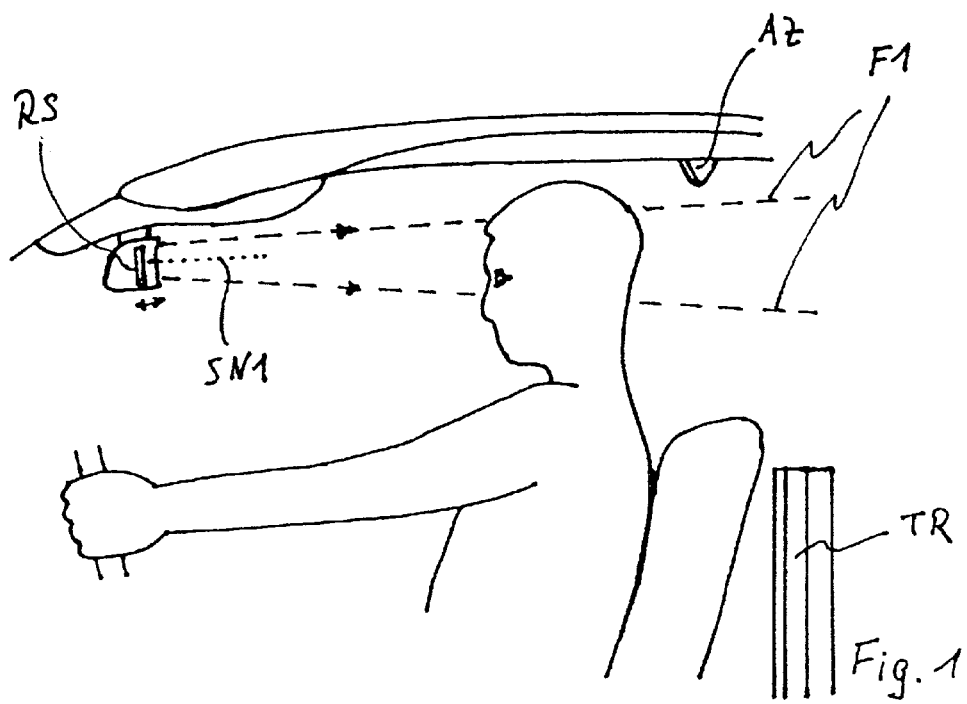
FIG. 1 shows a side view of a mirror alignment with a field of view for driving forwards.

In the illustrated sketch for driving forwards in FIG. 1, the rear-view mirror RS assumes a first alignment, characterized by the direction normal to the centre of the mirror surface being in SN1. The field of view F1 which the driver can see in the rear-view mirror is sketched bounded by a dashed line, and points at the rear window of the vehicle. A display apparatus AZ mounted on the vehicle ceiling is outside the field of view F1, and the driver thus cannot see it in the rear-view mirror. A partition wall TR is assumed to have been lowered to a low position behind the backrest RL of the driver's seat, so that it does not block the view from the mirror to the rear window.

Figure 2:
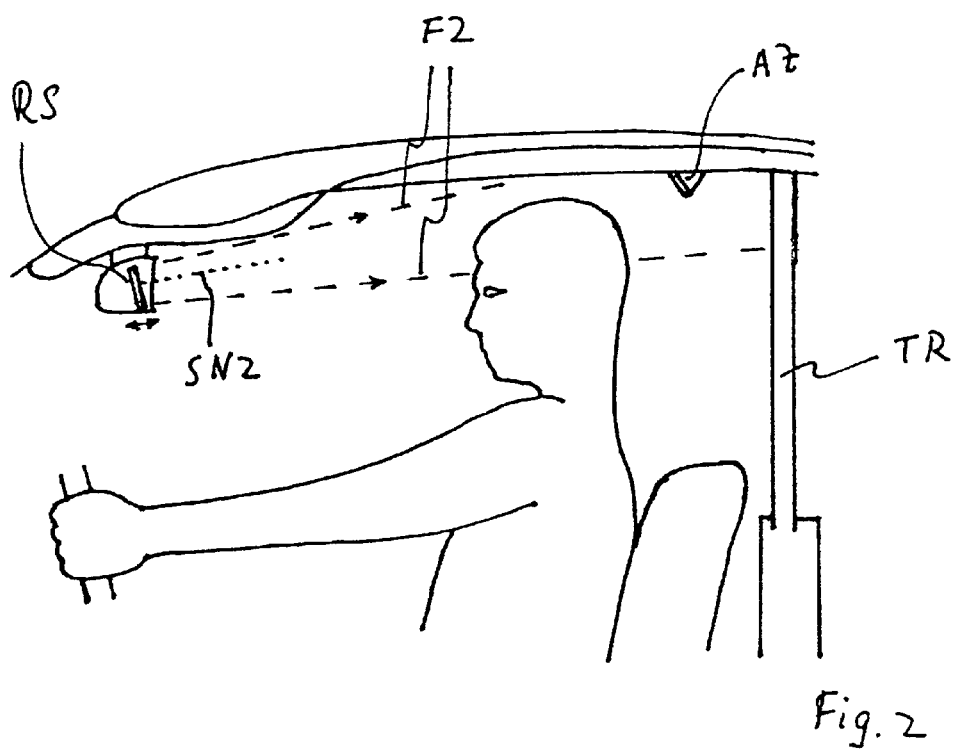
FIG. 2 shows a side view of a mirror alignment with a field of view for driving rearwards.

In the situation sketched for driving rearwards in FIG. 2, the rear-view mirror assumes a second alignment, which is characterized by the normal SN2 being tilted upwards from that in FIG. 1, in a direction F2. With this mirror alignment, the field of view F2 of the mirror includes the display apparatus AZ, which the driver can thus see in the rear-view mirror.

The display apparatus is arranged on the driver's side in the longitudinal direction of the vehicle shortly in front of the partition wall, which is sketched in the raised state in FIG. 2.

In order to offer the driver the normal display over the monitoring area when the partition wall is lowered as in FIG. 1, even when looking directly to the rear, as is then possible, a conventional display can also be arranged in a known manner in the rear area of the vehicle ceiling. This can be deactivated when the partition wall is raised.

In the case of a partition wall which can be lowered as a view obstruction which may be present at times, and a second conventional display apparatus in the rear area, the automatic mirror adjustment can also be deactivated when driving rearwards and the partition wall is lowered, or can be deactivated automatically by the partition wall position, so that the driver sees the field of view F1 through the rear window in the rear-view mirror.

The features which have been described above, are specified in the claims and can be seen in the figures can advantageously be implemented both individually and in various combinations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle arrangement comprising:
   a rear-view mirror mounted on the interior of the vehicle and observable by a driver, the rear-view mirror being automatically switchable between a first alignment and at least one further alignment as a function of at least one variable vehicle parameter; and,
   a display apparatus mounted in the interior of the vehicle which, in one of said at least one further alignment, is observable by said driver via the rear-view mirror.

2. The arrangement according to claim 1, wherein, at least in the first alignment, the rear-view mirror can be adjusted automatically for different specific drivers.

3. The arrangement according to claim 1, wherein the display apparatus is positioned on the vehicle ceiling.

4. The arrangement according to claim 1, wherein a partition wall is positioned behind the driver, and the display apparatus is arranged in front of the partition wall.

5. The arrangement according to claim 1, wherein said at least one variable vehicle parameter is the direction of travel selected via a direction of travel selection apparatus, and one of the at least one further alignment of the rear-view mirror is associated with the selection of the rearward direction of travel.

6. The arrangement according to claim 1, wherein a monitoring device is provided for a rearward monitoring area, and information obtained via the monitoring device is displayed via the display apparatus.

7. The arrangement according to claim 1, wherein one of said at least one variable vehicle parameter is the position of a partition wall which is positioned behind the vehicle, and one of the at least one further alignment of the rear-view mirror is associated with the state of the positioned partition wall.

8. The arrangement according to claim 1, wherein said display apparatus is observable by said driver through reflection in said rear-view mirror.

9. The arrangement according to claim 1, wherein said display apparatus is not observable by said driver in said first alignment of said rear-view mirror.

* * * * *